US012460779B2

(12) United States Patent
Li et al.

(10) Patent No.: US 12,460,779 B2
(45) Date of Patent: Nov. 4, 2025

(54) RETROFIT TUBULAR LAMP WITH SINGLE SWITCH DEVICE

(71) Applicant: SIGNIFY HOLDING B.V., Eindhoven (NL)

(72) Inventors: Zhaoting Li, Shanghai (CN); Xiujuan Wu, Shanghai (CN); Deyong Kong, Shanghai (CN); Xiangdong Zhang, Shanghai (CN); Yuafen Cheng, Shanghai (CN); Zhengyu Wang, Shanghai (CN); Xiaolin Chen, Shanghai (CN); Borong Su, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/682,223

(22) PCT Filed: Jul. 18, 2022

(86) PCT No.: PCT/EP2022/069993
§ 371 (c)(1),
(2) Date: Feb. 8, 2024

(87) PCT Pub. No.: WO2023/016756
PCT Pub. Date: Feb. 16, 2023

(65) Prior Publication Data
US 2025/0129900 A1    Apr. 24, 2025

(30) Foreign Application Priority Data

Aug. 9, 2021  (WO) ................ PCT/CN2021/111579
Sep. 10, 2021  (EP) ..................................... 21195887

(51) Int. Cl.
F21K 9/27          (2016.01)
F21K 9/278         (2016.01)
(Continued)

(52) U.S. Cl.
CPC ............. *F21K 9/278* (2016.08); *H05B 45/37* (2020.01); *H05B 47/155* (2020.01)

(58) Field of Classification Search
None
See application file for complete search history.

(56) References Cited

U.S. PATENT DOCUMENTS 9,844,123 B2    12/2017  Hsia
9,918,361 B1 *   3/2018  Espino ................. H05B 45/375
(Continued)

FOREIGN PATENT DOCUMENTS

EP         3050399 B1    12/2018
WO       2017174555 A1    10/2017
WO       2020021072 A1     1/2020

Primary Examiner — Anh Q Tran

(57) ABSTRACT

A retrofit tubular lamp having a single switch device configured to selectively connect a first end and a second end of an input interface together. When the two ends are connected, a converter is bypassed whilst supplying power to a light emitting arrangement of the lamp. When the two ends are disconnected, power is provided to the light emitting arrangement via the converter. The single switch device is further configured so that, when disconnecting the two ends from one another, a creepage distance between the two ends is equal to or greater than a predetermined safety distance (i.e. a safety creepage is created).

16 Claims, 7 Drawing Sheets

(51) Int. Cl.
*H05B 45/357* (2020.01)
*H05B 45/37* (2020.01)
*H05B 47/155* (2020.01)

(56) References Cited

U.S. PATENT DOCUMENTS

| | | |
|---|---|---|
| 10,920,972 B2 | 2/2021 | Ray et al. |
| 12,041,701 B2 * | 7/2024 | Zou ..................... H05B 45/345 |
| 2013/0335959 A1 | 12/2013 | Hsia et al. |
| 2015/0181661 A1 * | 6/2015 | Hsia ...................... H05B 47/26 |
| | | 315/160 |
| 2017/0105263 A1 | 4/2017 | Xiong et al. |
| 2017/0164434 A1 | 6/2017 | Xiong et al. |
| 2019/0032864 A1 | 1/2019 | Xiong et al. |
| 2021/0108766 A1 | 4/2021 | Roy |
| 2023/0175654 A1 | 6/2023 | Jin et al. |

* cited by examiner

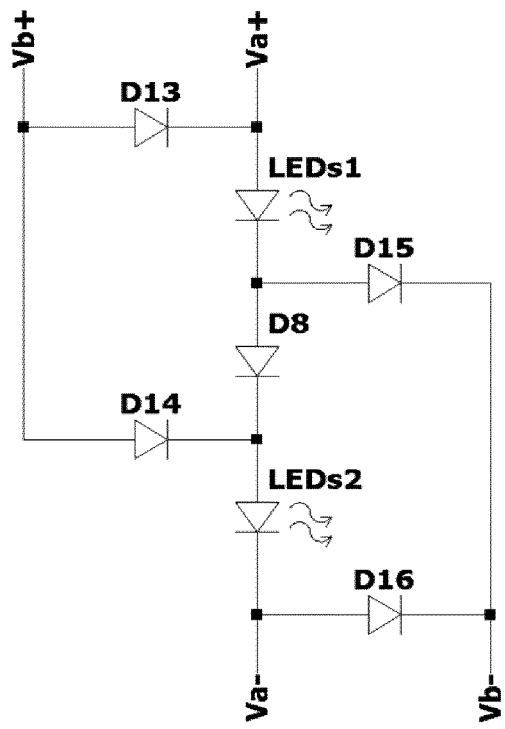
FIG. 6
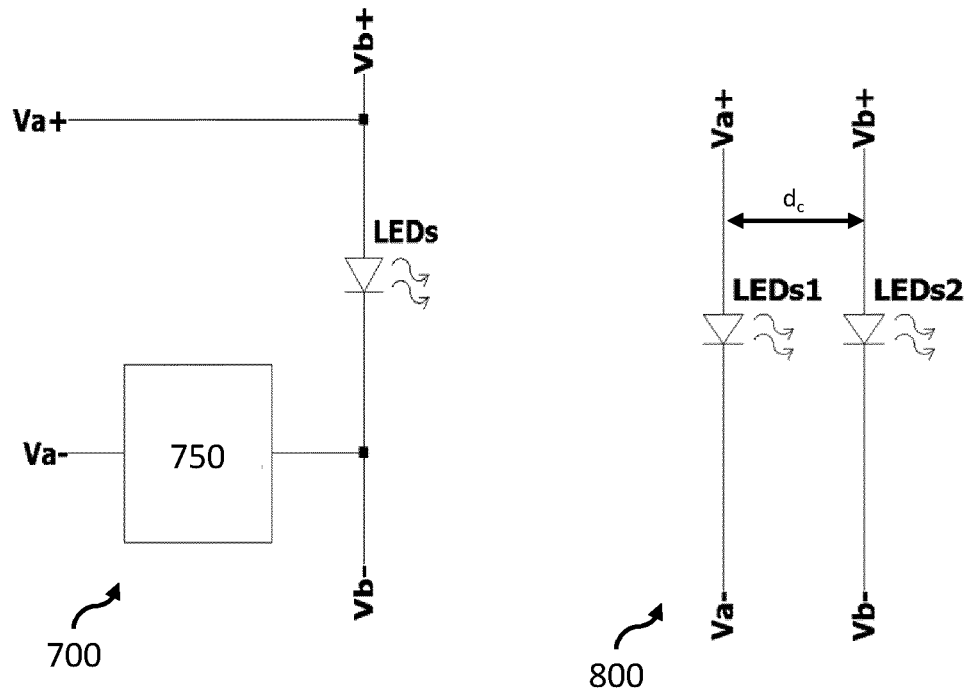
FIG. 7
FIG. 8

RETROFIT TUBULAR LAMP WITH SINGLE SWITCH DEVICE

CROSS-REFERENCE TO PRIOR APPLICATIONS

This application is the U.S. National Phase application under 35 U.S.C. § 371 of International Application No. PCT/EP2022/069993, filed on Jul. 18, 2022, which claims the benefit of International Application No. PCT/CN2021/111579, filed on Aug. 9, 2021 and European Patent Application No. 21195887.1, filed on Sep. 10, 2021. These applications are hereby incorporated by reference herein.

FIELD OF THE INVENTION

The present invention relates to the field of retrofit tubular lamps, and in particular to retrofit tubular lamps that can be powered using two different types of power source.

BACKGROUND OF THE INVENTION

There has been a growing interest in retrofit tubular lamps for replacing or retrofitting older lighting units such as particular fluorescent tube lamps. These retrofit tubular lamps should be designed so that they are able to draw power from a power source, such as a ballast, that was originally designed for powering a fluorescent lamp. However, as the market grows, there is also a growing business interest for new installations where there is no ballast and/or for re-wired installations in which (e.g. parts of) the ballast has been modified, bypassed and/or removed, meaning that the retrofit tubular lamps is able to directly draw power from utility power such as AC mains.

Thus, it would be beneficial if a retrofit tubular lamp could be configured to draw power from two types of power source. A first type may be a high frequency power source designed for powering a florescent lamp (i.e. comprising a ballast), such as an electronic ballast, and a second type may be a low frequency power source that comprises at least the AC mains supply, and may comprise an electromagnetic (EM) ballast.

There is an ongoing desire to reduce the size, cost and material requirements for circuitry used for a retrofit tubular lamp. There is also a desire to increase a safety for an installer of the retrofit tubular lamp, e.g. to reduce the chances of an installer providing a current path for electricity during installation of the retrofit tubular lamp.

SUMMARY OF THE INVENTION

The invention is defined by the claims.

A necessary function of retrofit tubular lamps is to configure the lamps to operate from both types of power source, as previously described, whilst ensuring sufficient safety for an installer or fitter of the lamp (i.e. when connecting the lamp to the power source). One issue is that there is a need for sufficient safety creepage between two ends of an input interface of the lamp to avoid undesirable current flow between the two ends.

FIG. 1 shows an existing retrofit tubular lamp 100 that meets these requirements. The lamp 100 comprises a pin safety circuit 105 such as relay with safety creepage between the two ends 111, 112 of an input interface of the lamp. The pin safety circuit is effectively open (via a relay being open, optionally at most allowing a human-safe current flowing through via a Y-capacitor) if a human body is touching one end 111 of the input interface of the lamp 100 while the other end 112 of the lamp is connected to the first type of power source (and vice versa), and the pin safety circuit 105 is closed (via the relay being closed) when both ends of the lamp are connected to the first type of power source without the human body therebetween.

Another requirement for a retrofit tubular lamp (adapted for both types of power source) is to have a converter 150, e.g. for converting a mains supply voltage to a suitable level for a lighting emitting arrangement LEDs1 of the lamp 100. However, this converter 150 should be bypassed or deactivated when a high-frequency power source supplies the retrofit tubular lamp since the high-frequency power source is already able to regulate a LED current and it is unnecessary to use the converter 150 anymore. In some known examples, a MOSFET (or similar transistor-based switch) is used to bypass the converter. In FIG. 1, the MOSFET is shown as the bypass MOS M1, and the converter 150 is a switch mode power converter, more specifically a buck converter. The buck converter 150 is formed of a controllable MOSFET switch M2, a diode D39, an inductor L1 and an output storage capacitor C7. Such a configuration of the buck converter is conventional in the art, and shall not be described for the sake of conciseness. Note that other topologies of converter is also applicable.

Other components of the existing retrofit tubular lamp 100 include rectifying circuitry D33, D35, D34, D36, D37, D38 and a matching circuit 140 and a capacitor C8. Their operation adheres to conventional procedures for a retrofit tubular lamp.

The present disclosure proposes an approach to integrating the above-identified requirements, by integrating or combining the bypass switch for the converter and the pin safety circuit that provides a safety creepage into a single switch device, which is connected between the first and second ends of the input interface. This ensures that there is a safety creepage between the first and second ends when a mains supply or EM ballast powers the converter, improving a safety of installing or fitting the lamp. In particular, a risk that a mains supply or EM ballast current will be conducted through the installer or fitter, e.g. if the first end is connected to the retrofit tubular lamp before installation is complete, will be significantly reduced. Furthermore, the single switch device is also open and provides safety creepage between the first and second ends when the lamp is not correctly connected to the HF ballast. Again, the switch device becomes closed when the lamp is correctly connected to the HF ballast, bypassing the converter so that the HF ballast can power the LEDs directly. All of these requirements are implemented by this single switch device.

According to examples in accordance with an aspect of the invention, there is provided a retrofit tubular lamp configured for use with both a first type of power source and a second type of power source.

The retrofit tubular lamp comprises an input interface comprising a first end and a second end that are both configured to be connectable to the first type of power source so as to receive power from the first type of power source, wherein the first end of the input interface is further configured to be connectable to the second type of power source so as to receive power from the second type of power source, a converter; a light emitting arrangement; a single switch device configured to be operable in at least a first switching state and a second switching state, wherein: when operating in the first switching state and when the first type of power source is connected to the input interface, the single switch device is configured to provide a first current path between the first end and the second end of the input interface and supply power to the light emitting arrangement whilst decoupling the converter therefrom; and when operating in the second switching state and when the second type of power source is connected to the first end of the input interface, the single switch device is configured to provide power to the light emitting arrangement via the converter and create a safety creepage between the first end and the second end of the input interface.

The proposed approach uses a single switch device to selectively connect two ends of an input interface of a retrofit tubular lamp to one another, where the single switch device also connecting the ends bypasses a converter and disconnecting the ends provides a safety creepage between the two ends (whilst also allowing the converter to receive power and power the light emitting arrangement).

A creepage is a measure or size of the (non-conductive or insulating) spacing between two electrical components (i.e. electrically conductive components) or nodes, and may be measured in mm. Creating a safety creepage may effectively comprising creating a spacing (of insulating material) between two components or nodes that exceeds a predetermined value. In other words, a safety creepage may be a creepage that exceeds a predetermined threshold. The safety creepage thereby provides is a physical isolation to prevent or reduce a likelihood of electric shock. Preferably the safety creepage is at least 1.5 mm.

Embodiments provide retrofit tubular lamps with increased safety (e.g. for a user during installation), allow the converter to operate when a second type of power source is connected to the lamp (single-end input scenario), and simultaneously prevent a converter from powering the light emitting arrangement when a first type of power source is connected to the lamp. The proposed approach uses a single switch device to perform these three operations, to thereby simplify the circuitry of the lamp and minimize cost and material expense of the lamp.

The light emitting arrangement is preferably an LED light emitting arrangement, i.e. a light emitting arrangement comprising one or more LEDs.

The first type of power source may provide a high frequency (e.g. >30 kHz) power supply at the first and second ends of the input interface. The second type of power source may provide a low frequency (e.g. <100 Hz or <120 Hz) power supply at (only) the first end of the input interface.

In an embodiment, the retrofit tubular lamp may be further configured so that, when the single switch device is operating in the second switching state, to create a safety creepage between the second end and the first end optionally either when the first type of power source is connected with an external impedance or when the second type of power source is connected to the first end. The single switch device may be configured to be in the second switching state by default when the retrofit tubular lamp is not powered. In this embodiment, the single switch device also creates the safety creepage for the first type of power source when an external impedance is connected, and such an external impedance is typically human body. Thus this single switch device further achieves a fourth function of pin safety for double-end input scenario.

In an embodiment, the input interface may comprise a rectifying arrangement at the first end and the input of the rectifying arrangement is configured to be connectable to the first type and the second type of power source. This first end could be the end that couples to the second type of power source; while the second end should not be able to or couple or be designed for coupling to the second type of power source.

In some examples, the input of the converter is connected to the output of the rectifying arrangement; the light emitting arrangement is connected to the output of the converter; and the single switch device comprises an input node connected to the output of the rectifying arrangement and an output node connected to the light emitting arrangement, wherein the switch device is configured to: when operating in the first switching state, allow current to flow between the input node and the output node to thereby provide the first current path and bypass the converter; and when operating in the second switching state, prevent current from flowing between the input node and output node, to thereby allow the converter to draw power.

In an alternative embodiment, the single switch device may comprise a change-over relay having an input terminal connected to the output of the rectifying arrangement; a first output terminal directly connected to the light emitting arrangement and a second output terminal directly connected to the converter. The change-over relay may be configured to: when the single switch device is operating in the first switching state, connect the input terminal to the first output terminal; and when the single switch device is operating in the second switching state, connect the input terminal to the second output terminal.

This embodiment improves the reliability of the selection of power path.

The retrofit tubular lamp may further comprise a drive part to generate a drive voltage from the first type of power source connected to the first end and the second end. The change-over relay may be configured so that the single switch device operates in the second switching state when no drive voltage is provided to the change-over relay.

In at least one example, the change-over relay comprises: a contact part that is movable between a first position, in which the contact part connects the input terminal to the first output terminal, and a second position, in which the contact part connects the input terminal to the second output terminal; and the drive part configured to control the position of the contact part and is coupled between the first end of the input interface and the second end of the input interface. The drive part may be configured to: retrieve enough power generate the drive voltage to control the position of the contact part when there is no external impedance connected to the input interface; and be unable to retrieve enough power to generate the drive voltage to control the position of the contact part when there is external impedance connected to the input interface.

In this embodiment, when there is external impedance for the double end power input, there is not sufficient power to drive the switch to close the path between the double end in low impedance, thus there would not be a large current through the external impedance/human body to thereby protect the human.

The drive part may comprise a coil configured to control the position of the contact part and a safety capacitor arrangement connected in series with the coil. The safety capacitor has a proper impedance to limit the current from shocking human body and disable driving the coil when human body is present, and be sufficient to draw enough current from the HF ballast when no human body is present so as to drive the coil into close state.

In at least one example, the single switch device comprises a comprises a dip switch or relay having an switch input terminal connected to the output of the rectifying arrangement; a first switch output terminal directly connected to the light emitting arrangement; a second switch output terminal directly connected to the converter; and a switching part connected to the switch input terminal and controllable between at least: a first switching part position, in which the switching part connects the switch input terminal to the first switch output terminal to thereby cause the single switch device to operate in the first switching state; a second switching part position, in which the switching part connects the switch input terminal to the second switch output terminal to thereby cause the single switch device to operate in the second switching state; and a third switching part position, in which the switching part is disconnected from both the first switch output terminal and the second switch output terminal. The dip switch or relay may be a center-off switch, such as a double pole, center-off switch. This embodiment provides a manual way of configuration.

In an embodiment, the single switch device may be configured to that the creepage distance between the switching part, when in the third switching part position, and the first switch output terminal is greater than a predetermined threshold, optionally 1.5 mm.

In some examples, the light emitting arrangement comprises: a plurality of light emitting units; and a re-configuring circuit configured to: when the single switch device is operating in the first switching state, configure the light emitting units to be connected in series; and when the single switch device is operating in the second switching state, configured the light emitting units to be connected in parallel. In other words, when the lamp is powered by the first type of power source (e.g. high frequency), the light emitting units are in parallel; otherwise when the lamp is powered by the second type of power source (e.g. low frequency), the light emitting units are in series. There is a use case of two lamps connected in series with AC mains. The inventors find that by having series connected light emitting units, powered by the converter, in each lamp, it can improve the light output unity of different lamps. Preferably, this is determined by the converter's inherent characteristics.

The retrofit tubular lamp may further comprise a linear regulator connected between the converter and the light emitting units for the second type of power source, optionally wherein said linear regulator is decoupled from the first current path between the first end and the second end of the input interface for the first type of power source. This linear regulator may therefore only be in the power path for the second type of power source. In this way it can reduce the low frequency ripple caused by the second type of power source whilst not interfering with the high frequency first type of power source. Thus, a double advantage can be provided.

In at least one example, the first type of power source is a high frequency power source/ballast configured for powering a fluorescent lamp and the second type of power source is a low frequency power source, optionally including mains supply or a low frequency ballast configured for powering a fluorescent lamp. A high frequency may be a frequency greater than 1 kHz, e.g. greater than 10 kHz, e.g. greater than 30 KHz. A low frequency may be a frequency lower than 1 kHz, e.g. lower than 120 Hz/100 Hz, e.g. a mains supply frequency.

In some examples, the retrofit tubular lamp is configured wherein: the rectifying arrangement at the first end of the input interface comprises a positive rectifying output node and a negative rectifying output node; the tubular lamp further comprising a further rectifying arrangement at the second end of the input interface comprising a further positive node and a further negative node; and the single switch device comprises a first switching element and a second switching element being actuated as a whole.

The single switch device is configured to: when operating in the first switching state and when the first type of power source is connected to the input interface, control the first switching element to connect the positive rectifying output node to the further positive node of the second end of the input interface and control the second switching element to connect the negative rectifying output to the further negative node of the second end of the input interface; and when operating in the second switching state and when the second type of power source is connected to the input interface, control the first and second switching element to disconnect the positive and negative rectifying output nodes from the further positive and negative nodes of the second end of the input interface.

The above embodiment provides detailed implementation of the lamp.

As mentioned above, in order to provide light output unity of different lamps connected series with AC mains, it is desirable to set the converter work in a high output voltage such that the converter's output current is more unified with another lamp. To achieve this, in another aspect of the invention, it is proposed a tubular LED lamp with a LED arrangement, a first end and a second end, where the first end is adapted to connect to a low frequency power supply, and the first and the second ends are adapted to connect to a high frequency power supply, characterized in that, comprising a control circuit adapted to: detect whether a power supply is received at the first end, or between the first and the second ends, and configure the LED arrangement in a first mode having series LEDs when the power supply is received at the first end, not between the first and the second ends; and configure the LED arrangement in a second mode having parallel LEDs when the power supply is received between the first and the second ends.

There is a prior art EP3050399B1 that sense the frequency of the input and configure the LEDs into series or parallel according to the sensed frequency is HF ballast frequency or EM ballast frequency. The above aspect of the invention differs from the prior art in that it detects whether the power comes in from the first end only or from both ends and configures the LEDs into series or parallel according to the power comes in from the first end only or from both ends.

In a detailed embodiment, the tubular LED lamp further comprises a pin safety switch between the first and the second ends, in series with the LED arrangement, and a bypass capacitor in parallel with the safety switch (this is already know and there are many prior arts), wherein the control circuit, together with the bypass capacitor, is adapted to configure the LED arrangement in the second mode in case either a supply with either the low frequency or the high frequency is connected between the first and the second ends. In this embodiment, the control circuit is a wide band frequency driver that is responsive to both low and high frequency supply as long as it is between the first end and the second end. This makes the tubular LED lamp's configuration solely depends on the input is via first end only or is via both end, without determined by the frequency of the input.

In a further embodiment, the control circuit is adapted to set the LED arrangement in the first mode by default, and change the LED arrangement into the second mode in response to the power supply across the first and the second ends.

In an alternative third aspect, instead of detecting whether the supply comes in via a single end or both ends, it is proposed that to detect an amplitude of the voltage on the bus to differentiate whether the input is AC mains or HF ballast. More specifically, it is proposed a retrofit tubular lamp configured for use with both a first type of power source and a second type of power source, comprising an input interface comprising a first end and a second end that are both configured to be connectable to the first type of power source so as to receive power from the first type of power source, wherein the first end of the input interface is further configured to be connectable to the second type of power source so as to receive power from the second type of power source,
a converter;
a LED arrangement coupled to the converter;
a bypass switch adapted to bypass or not bypass the converter according to a frequency of the input;
characterized in that, further comprises:
a voltage detector to detect a voltage before the bypass switch and adapted to change the LED arrangement into series LEDs or parallel LEDs according to the voltage.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIGS. 6 to 8 illustrate light emitting arrangements for the retrofit tubular lamp;

DETAILED DESCRIPTION OF THE EMBODIMENTS

Figure 1:
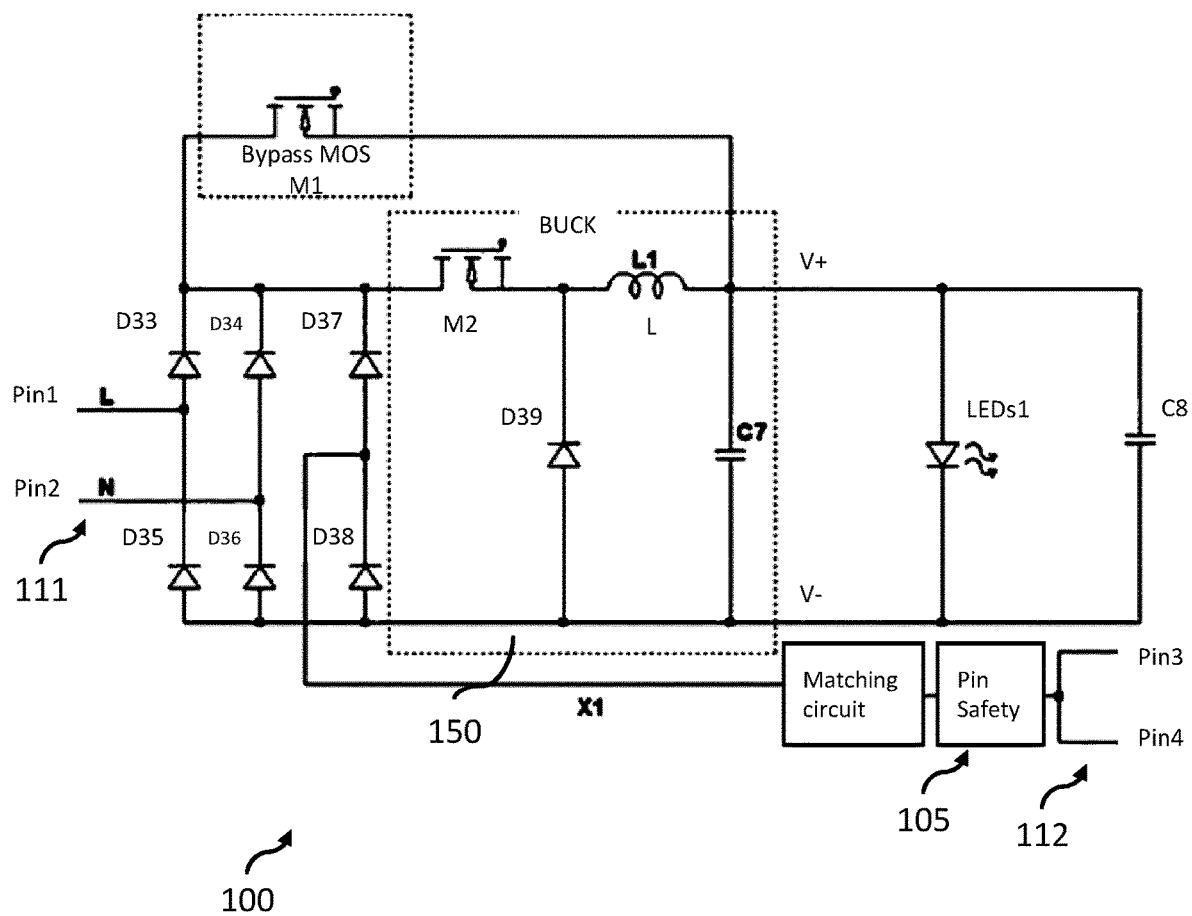
FIG. 1 illustrates a known retrofit tubular lamp configured for a first and second type of power source.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a retrofit tubular lamp. A single switch device is configured to selectively connect a first end and a second end of an input interface together. When the two ends are connected, a converter is bypassed whilst power across both ends (i.e. double-end power) is supplied to a light emitting arrangement of the lamp. When the two ends are disconnected, power is provided to the light emitting arrangement via the converter at a single end. The single switch device is further configured so that, when disconnecting the two ends from one another, a creepage distance between the two ends is equal or greater than a predetermined safety distance (i.e. a safety creepage is created). In short, both a bypass function and a safety creepage function are provided by a single switch device.

Figure 2:
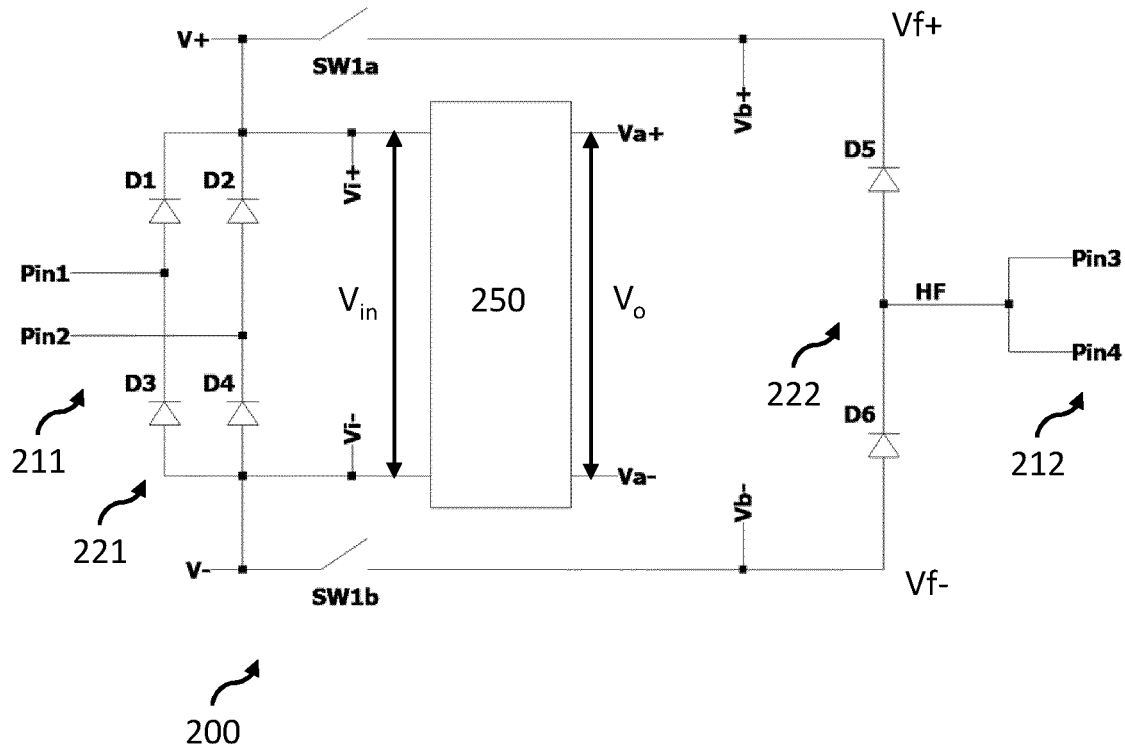
FIG. 2 illustrates a driver for a retrofit tubular lamp.

FIG. 2 illustrates a first configuration of a driver 200 for a retrofit tubular lamp according to an embodiment.

The driver 200 is configured to drive a light emitting arrangement (not shown), which is formed of LEDs, irrespective of whether the power source for the driver is the first type of power source or the second type of power source.

As previously explained, the first type may be a high frequency power source designed for powering a florescent lamp (i.e. comprising a high frequency ballast) and a second type may be a low frequency power source that comprises at least the AC mains supply or a low frequency ballast. Thus, the first type of power source may provide high frequency power (e.g. >30 kHz) and the second type of power source may provide low frequency power (e.g. <120 Hz/100 Hz such as the mains power supply frequency).

The driver comprises an input interface comprising a first end 211 and a second end 212. The first end 211 comprises a first input node Pin1 and a second input node Pin2. The second end 212 comprises a third input node Pin3 and a fourth input node Pin4, which are connected together. There could be extra filament circuits at the first end 211, and at the second end 212, and those filament circuit are for compatibility with HF ballast. Those filament circuits are not relevant with the present invention and are therefore omitted.

The first end 211 and the second end 212 are both configured to be connectable to the first type of power source to receive power from the first type of power source. The first end of the input interface is further configured to be connectable to the second type of power source to receive power from the second type of power source. Those are two typical installations of this lamp, especially in the European region. The user should be instructed not to connect the second end to the second type of power source. There should be a label on the lamp or a protection circuit to mitigate the risk of such a wrong connection. Anyway, this is also not relevant with the present invention thus no more details will be given.

Thus, when the driver is connected to the first type of power source, power is supplied at both ends of the input interface. This is also called a double end input. When the driver is connected to the second type of power source, power is supplied at only the first end of the input interface. This is also called a single end input.

The driver further comprises a rectifying arrangement 221, formed of a plurality of diodes D1, D2, D3, D4. The rectifying arrangement 221 provides a positive rectifying output node V+ and a negative rectifying output node V−. The rectifying arrangement is configured so that only positive voltage can flow to the positive rectifying output node from the first end 211 and that only negative voltage can flow to the negative rectifying output node from the first end 211. Here, the rectifying arrangement is a bridge rectifier.

The driver 200 further comprises a further rectifying arrangement 222. The further rectifying arrangement formed of a plurality of diodes D5, D6. The further rectifying arrangement comprises a further positive node Vf+ and a further negative node Vf−. The further rectifying arrangement is configured so that only positive voltage can flow to the further positive node Vf+ from the second end 212 and that only negative voltage Vf− can flow to the further negative output node from the second end 212.

The driver further comprises a converter 250. The converter may be a switched-mode power supply or other form of AC/DC to DC converter, and may comprise a buck converter, a boost converter and/or a buck-boost converter. An example of a suitable buck converter is illustrated in FIG. 1.

The converter 250 is configured to convert a power $V_{in}$ supplied at converter input nodes Vi+, Vi− to generate a DC supply $V_o$ at first voltage supply nodes Va+, Va− for powering the light emitting arrangement. In this first configuration of the driver, the converter input nodes Vi+, Vi− are directly connected to the rectifying output nodes V+, V−.

The driver 200 further comprises a single switch device SW1 (which could be a relay of integrated double contacts of SW1a, SW2a). The single switch device operates to selectively bypass the converter 250 by closing the switch device. When the converter is bypassed (by the single switch device), the light emitting arrangement is powered by second voltage supply nodes Vb+, Vb−. Vb+ is directly connected to Vf+, Vb− is directly connected to Vf−. When the converter is not bypassed, the light emitting arrangement is powered by the first voltage supply nodes Va+, Va− provided by the converter 250.

Thus, there are two sets of voltage supply nodes for the light emitting arrangement. A first set includes the first voltage supply nodes Va+, Va− and a second set includes the second voltage supply nodes Vb+, Vb−.

The single switch device is schematically illustrated using separate sub-switches, but may be actually integrated into a single device such as a double-contact relay or a double pole, single throw switch.

The single switch device is operable in in at least a first switching state and a second switching state.

When operating in the first switching state and when the first type of power source is connected to the input interface, the single switch device is configured to provide a first current path between the first end and the second end of the input interface and supply power to the light emitting arrangement whilst decoupling the converter therefrom.

In the illustrated example, the single switch device will become closed, to connect the positive rectifying output node V+ to the further positive node Vf+ (and therefore to Vb+) and to connect the negative rectifying output node V− to the further negative node Vf− (and therefore to Vb−).

In this way, when the single switch device is operating in the first switching state and the first type of device is connected to the input interface (at the first and second ends), in case power is positive at the first end 211, current flows from Pin1-Pin2, through diodes D1-D2, then to Vb+, which connect to the light emitting arrangement, then to Vb−, and through D6, finally to the second end 212; in case power is positive in second end, current flows from Pin3/Pin4, through diode D5, then to Vb+, which connect to the light emitting arrangement, then to Vb−, and through diodes D3-D4, finally to the first end Pin1-Pin2. In this case, the converter 250 is in a non-operational state or condition.

In this way, when the single switch device is operating in the first switching state, the second set of voltage supply nodes Vb+, Vb− provides the voltage supply for the light emitting arrangement.

When operating in the second switching state and when the second type of power source is connected to the first end of the input interface, the single switch device is configured to provide power to the light emitting arrangement via the converter and create a safety creepage between the first end and the second end of the input interface.

In this way, when the single switch device is operating in the second switching state and the second type of device is connected to the input interface (at the first end), in case Pin1 is positive, current flows from Pin1, through the diode D1, at node Vf+, and to the converter 250, which thereby provides voltage at Va+/Va− for powering a connected light emitting arrangement, returning at node Vf−, diode D4 and to Pin2; vice versa for a case that Pin2 is positive.

Thus, when the single switch device is operating in the second switching state, the first set of voltage supply nodes Vb+, Vb− provides the voltage supply for the light emitting arrangement.

Since the switch is open, a safety creepage is achieved when a creepage distance between the first end and the second end of the input interface (i.e. the contact points of the single switch device) is greater than a predetermined safety distance, e.g. 1.5 mm. This can be achieved through use of an appropriately configured switching device, e.g. a double contact relay. Thus a human touching the second end, when he/she installs the first end into the socket, would be electrically connected to power provided at the first end, and is therefore safe.

By using the single switch device to provide a safety creepage when operating in the second switch state, the proposed approach effectively combines the function of a bypass switch with pin-safety. This simplifies the circuitry of the retrofit tubular lamp.

The operation of the single switch device may be controlled by a switch driver (not shown). The switch driver may be configured to close the switch to connect the first and second ends of the input interface together when a high frequency power is supplied to the input interface (i.e. the first type of power source provides power) and disconnect the first and second ends when there is no or not enough high frequency power supplied across the first and second ends (for safety creepage in double end input scenario). More specially, the switch driver can connect to both ends and detect whether there is sufficient AC signal flowing between both ends. If there is sufficient AC signal, meaning a HF ballast may be correctly connected, the switch driver closes the switches to bypass the converter and allow the LED arrangement be powered by the first type of power source; otherwise the switch driver keep the switches open to create safety creepage between the two ends, while allowing the converter being powered by a potential second type of power source at the first end. Thus, the switching state of the single switch device may be dependent upon the type of power source connected to the input interface.

Figure 3:
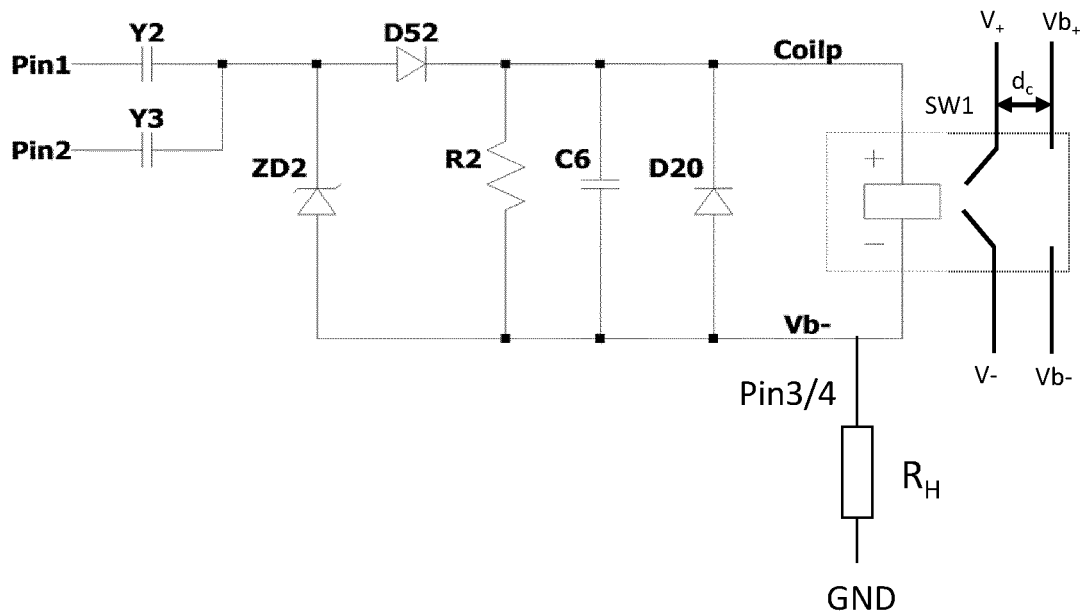
FIG. 3 illustrates a switch driver for use with a driver for the retrofit tubular lamp.

FIG. 3 illustrates an example of a switch driver 300 for controlling the operation of the single switch device SW1.

Here, the single switch device SW1 is a change-over relay having two input terminals and two output terminals. The change-over relay comprises a contact part which is moveable between a first position, in which the input terminals and output terminals are disconnected from one another, and a second position, in which each input terminal connects to a respective output terminal. SW1 is therefore a double pole, single throw switch.

One input terminal is connected to the positive rectifying output node V+, and controllably connects to an output terminal connected to Vb+. Another input terminal is connected to the negative rectifying output node V− and controllably connects to an output terminal connected to Vb−.

A drive part controls the position of the contact part. The drive part may comprise a coil configured to (when provided with sufficient voltage) connect the input terminals to the output terminals. Otherwise (i.e. in an unpowered state) the drive part may disconnect the input terminals from the output terminals.

The single switch device SW1 is configured so that when the input and output terminals are disconnected, a creepage distance de is greater than or equal to a (minimum) safety distance, e.g. greater than or equal to 1.5 mm. Other safety distances are noted later. The switch driver 300 controls the voltage supplied to the drive part of the single switch device SW1.

The switch driver 300 is powered by high frequency AC current provided at Pin1/Pin2, Vb−, and Pin3/4. This current passes through a switch rectifying arrangement (comprising a diode D52). The rectified power is smoothed by smoothing capacitor C6 to provide DC power at switch control node Coilp. The DC power across C6 drives the switch relay SW1.

Grounding resistor R2 is configured to provide a path for the rectified power to ground (i.e. at Vb−). Diode D20 prevents the voltage at the switch control node Coilp from dropping below the voltage at Vb−.

A respective Y-capacitor Y2, Y3 is connected is series with each pin Pin1, Pin2. The capacitance of these capacitors is selected to limit the charging current. Appropriate selection of the capacitance means that the drive part of the single switch device is only powered when high frequency power is supplied at the pins Pin1/Pin2 and Pin3/Pin4, optionally without a human body impedance, such that pin safety for high frequency ballast can be achieved.

In summary, the working principle of the single switch device SW1 and the switch driver is: when a power source of the first type provides (high-frequency) power at the both ends, the capacitors have a low/proper impedance and there is sufficient power to drive SW2 (i.e. the circuit closes); when a power source of the second type provides (low-frequency) power at the pins Pin1, Pin2, the capacitors have a high impedance and avoid a short circuit between pins Pin1 and Pin2.

Improved pin-safety can be realized by appropriate configuration of the (impedance of the) capacitors Y2, Y3. In particular, if there is human/body impedance RH at the external of second end Pin3/Pin4 of the input interface (e.g. connected to Vb−), the combined impedance of the capacitor(s), RH and the drive part of the single switch device may be configured to be so large that the drive part does not receive enough voltage (i.e. the voltage at Coilp is insufficient to operate the drive part). The switch SW1 would therefore not close, and this prevents a large current from flowing through the input interface and the human body, improving a safety of human touching. Of course, if there is no human/body impedance, the combined impedance of the capacitor(s) and the drive part of the single switch device is sufficient to operate the drive part of the single switch device to close the switch SW1.

Figure 4:
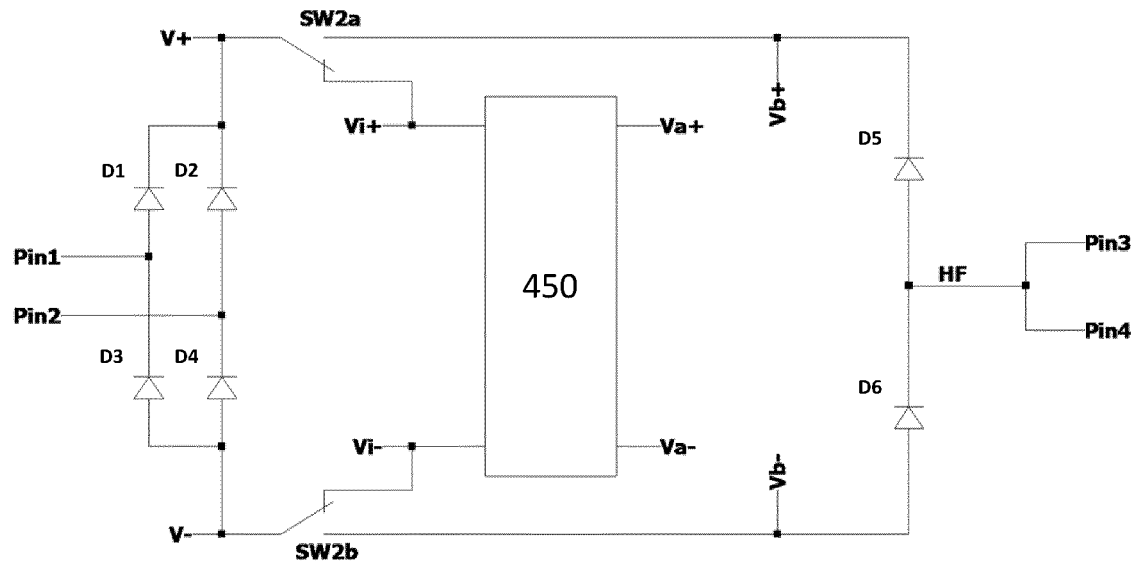
FIG. 4 illustrates a driver for the retrofit tubular lamp.

FIG. 4 illustrates a second configuration for a driver 400 for a retrofit tubular lamp according to an embodiment.

The driver 400 differs from the driver 200, previously described, in the configuration of the single switch device SW2 and the surrounding terminal connections.

The single switch device SW2 comprises a double pole, double throw switch. The single switch device SW2 is formed of a first sub-switch SW2a and a second sub-switch SW2b. The first sub-switch SW2a controllably connects V+ to either Vi+ (which is no longer directly connected to V+) or to Vb+, the second sub-switch SW2b controllably connects V− to either Vi− (which is no longer directly connected to V−) or to Vb−.

The operation of driver 400 is almost identical to the operation of driver 200 previously described, excepting that when the converter is bypassed (i.e. when V+ connected to Vb+ and V− connects to Vb−) the converter is no longer connected to the output of the rectifying arrangement (i.e. it is completely disconnected). Thus, the second switching state is modified so that, instead of simply disconnecting the first end from the second end, the first end is disconnected from the second and connected to the (input of the) converter. Similarly, the second switching state is modified so that, instead of simply connecting the first end to the second end, the first end is connected to the second end and disconnected from the converter.

The working principle of the driver 400 is therefore as follows.

When the single switch device SW2 is operating in the first switching state and the first type of device is connected to the input interface, the switch SW2a/b switches to Vb+/− position, and across the first and second ends, current flows via Pin1-Pin4, through diodes D1-D6, and through Vb+/Vb− which connect to the light emitting arrangement. In this case, the converter 150 is disconnected from the rectifying arrangement so that the input nodes Vi+, Vi− are floating or at high-impedance.

When the single switch device SW2 is operating in the second switching state and the second type of power source is connected to the first end of the input interface, the switch SW2a/b is at the illustrated position, and current flows via Pin1 and Pin2, through the diodes D1-D4 and to the converter 450, which thereby provides voltage at Va+/Va− for powering a connected light emitting arrangement. In this case, the converter is connected to the output of the rectifying arrangement, and the second end of the interface is disconnected from the first end of the interface.

When in the second switching state, the single switch device SW2 is configured so that a creepage distance (between the first end and the second end) is greater than a predetermined safety distance (e.g. 1.5 mm). In other words, a safety creepage is provided.

As the converter 450 is no longer connected to the output of the rectifying arrangement when it is bypassed in case that the first type of power source is connected, the converter 450 does not have a risk of triggered by a non-lighting voltage of the first type of power source, and considerations on the structure of the converter (e.g. whether to use a buck or a boost converter) no longer need to be considered. Thus, the configuration for the driver 400 of FIG. 4 provides more flexibility than the driver 200 of FIG. 2. However, the single switch device of the first configuration (double pole, single throw) is simpler, more cost effective and uses fewer materials than the single switch device of the second configuration.

The configuration and operation of the switch driver for the driver 400 of FIG. 4 may be identical to that illustrated in FIG. 3, excepting that the switch is configured to, when not being powered to connect the first end of the interface to the second end of the interface, connect the first end of the interface to the converter 450 (i.e. rather than simply floating).

The switch driver and switch may be configured so that, when the drive part is unpowered, the switch connects V+ to Vi+ and V− to Vi−. This improves a safety for a person installing or fitting the retrofit tubular lamp, e.g. as no current will be permitted to flow to the second end of the input interface from the first end of the input during installation (e.g. if a mains power source is connected to the first end of the input interface).

Figure 5:
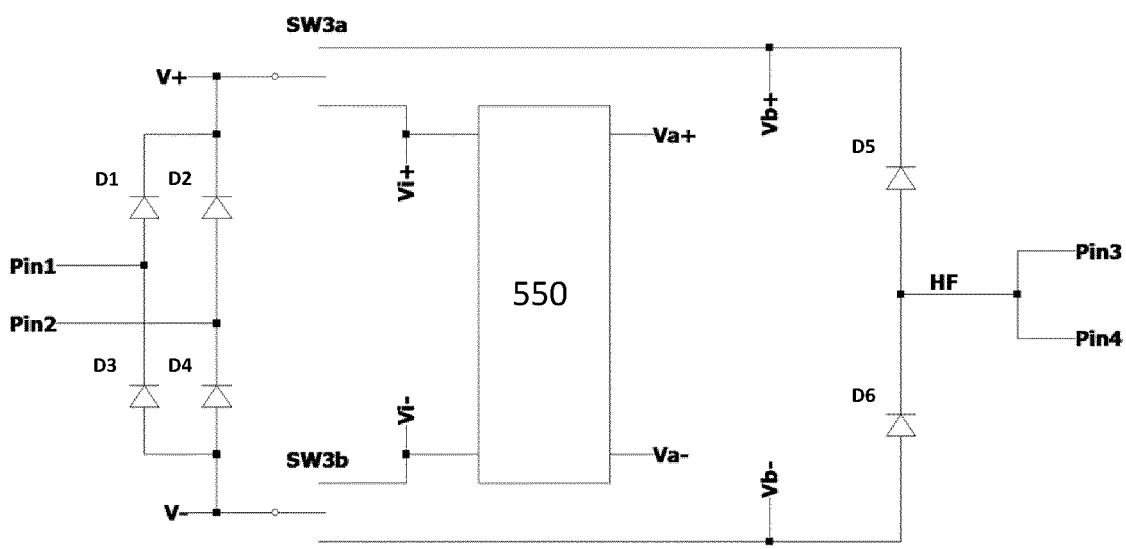
FIG. 5 illustrates a driver for the retrofit tubular lamp.

FIG. 5 illustrates a third configuration for a driver 500 for a retrofit tubular lamp according to an embodiment.

The driver 500 differs from the first configuration 100 and the second configuration 400 in the configuration of the single switch device SW3 and the surrounding terminal connections.

The single switch device SW3 comprises a double pole, changeover switch or a double pole, center off switch. The single switch device SW3 is formed of a first sub-switch SW3a and a second sub-switch SW3b. The first sub-switch SW3a controllably connects V+ to Vi+ (which is not directly connected to V+) or to Vb+ or to neither (i.e. floating). The second sub-switch SW3b controllably connects V− to Vi− (which is not directly connected to V−) or to Vb− or to neither (i.e. floating).

The working principle of the driver 500 is similar to the driver 400. However, the single switch device is further operable in a third switching state, in which the single switching device disconnects the converter 550 from the input interface and disconnects the first end from the second end of the input interface.

The third switching state can increase a safety upon installation of the retrofit tubular lamp, as there is no electrical connection (i.e. no current can flow) between the input and the output of the driver 500 in the third switching state.

The single switch device SW3 therefore comprises a switching part moveable between three switching positions: a first switching position (in which it connects V+ to Vb+ and V− to Vb−), a second switching position (in which it connects V+ to Vi+ and V− to Vi−) and a third switching position (in which V+ is disconnected from Vb+ and Vi+ and V− is disconnected from Vb− and Vi−).

Preferably, the single switch device SW3 is configured so that, when the switching part is in the third switching position, a creepage distance between the first end of the input interface is greater than or equal to a predetermined safety distance (e.g. >=1.5 mm).

The single switch device SW3 may be a manually operated switch, e.g. may not be associated with a switch driver like the examples of the single switch device in the first and second configurations of the driver.

Alternatively, the single switch device could be based on input detection (i.e. of the type of power source that is connected to the input interface).

In all above configurations for the driver of the retrofit tubular lamp, there are two sets of voltage (power) supply nodes for the light emitting arrangement. The switching state of the single switch device (and therefore the type of power source) controls which set provides the voltage (power) supply to the light emitting arrangement. It is therefore simple to realize different light outputting arrangements that depend upon the set of voltage supply nodes used (and therefore the type of power source).

Thus, the proposed configurations for a driver of the retrofit tubular lamp, which each comprise two sets of voltage supply nodes, provide new opportunities for configuring and controlling a light emitting arrangement.

FIG. 6 illustrates a first configuration for the light emitting arrangement 600 of the retrofit tubular lamp.

The light emitting arrangement 600 is configured to receive power from either the first set Va+, Vb− of voltage supply nodes or the second set Vb+, Vb− of voltage supply nodes.

The light emitting arrangement 600 comprises two LED sets (each comprising one or more LEDS), a first LED set LEDs1 and a second LED set LEDs2. Each LED set may comprise a (part of) a tubular LED. The light emitting arrangement 600 further comprises a diode arrangement, comprises diodes D8, D13, D14, D15 and D16.

The diodes are configured so that, when power is received from the first set Va+, Va− of voltage supply nodes, the first LEDs1 and second LEDs2 LED sets are connected in series (i.e. current flows through the first set and then through the second set).

The diodes are also configured so that, when power is received from the second set Vb+, Vb− of voltage supply nodes, the first LEDs1 and second LEDs3 LED sets are connected in parallel (i.e. current is split between the first and second sets).

The diodes therefore act as a re-configuring circuit for configuring the LED sets to be connected in series or in parallel.

The proposed driver for a retrofit tubular lamp, which provides two sets of voltage supply nodes for the light emitting arrangement, therefore obviates the need for additional switches in the light emitting arrangement to define whether the LED sets are connected in series or in parallel. This makes the series-parallel connection change easier to implement, more reliable (by avoiding use of switches) and lower (material) cost.

The skilled person would appreciate how the diodes D8, D13, D14, D15, D16 may be replaced by an appropriate switch arrangement, which can therefore act as the re-configuring circuit.

FIG. 7 illustrates a second configuration for the light emitting arrangement 700 of the retrofit tubular lamp.

FIG. 7 illustrates how a ripple remover 750 (e.g. comprising a linear regulator and/or other similar circuitry) can be added to smooth the current provided at the first set of voltage supply nodes Va+/− without smoothing a current provided at the second set of voltage supply nodes (i.e. it can be disabled or bypassed).

This approach mitigates the low frequency ripple of the low frequency second type of power source. Moreover, avoiding the ripple remover being active when the first type of power source powers the retrofit tubular lamp can avoid a power loss of the first type of power source as well as conflict between the ripple remover with the first type of power source such as a conflict between a slow response linear regulation with a spike ignition voltage. By using the ripple remover, there is no need to use a large output capacitor for the second type of power source, this can help reduce any afterglow when the retrofit tubular lamp is turned off in case the second type of power source is used. From another angle, there is neither a need to use large output capacitor for the first type of power source since its frequency is very high and insensible for human. Overall, no large output capacitor is used and afterglow is prevented.

The use of two sets of voltage supply node avoids the need for additional switching circuits or the like to control whether a ripple remover is active or not.

The concept illustrated in the second configuration can be easily adapted for use in the first configuration of the light emitting arrangement, e.g. through appropriate positioned of the ripple remove (e.g. between Va− and the second LED set).

FIG. 8 illustrates yet another configuration for a light emitting arrangement 800 for the retrofit tubular lamp.

The light emitting arrangement provides two separate LED sets (of one or more LEDs). A first LED set LEDs1 is driven when power is supplied at the first set of voltage supply nodes Va+, Va−. A second LED set LEDs2 is driven when power is suppled at the second set of voltage supply nodes Vb+, Vb−. Otherwise, the LED sets are not driven.

Preferably, in this example, the light emitting arrangement 800 is configured so that a creepage distance de between V+, Vb+, V−, Vb−, and between the first and second LED sets is greater than or equal to a predetermined safety distance, e.g. 1.5 mm.

In some examples, a ripple remover may be connected in series with the first LED set LEDs1 and/or no ripple remover may be connected in series with the second LED set LEDs2. This approach reduces the period of an afterglow when a first power source (connected to the input interface) stops providing power to the retrofit tubular lamp.

In any described embodiment, the retrofit tubular lamp may comprise more than two LED sets, and any re-configuring circuits (if present) may be configured to connect said LED sets in any configuration (e.g. in series or in parallel). In any described embodiment, the LED sets may be replaced by other forms of light emitting units, for instance, halogen-based light emitting units.

In any above-described embodiment, the single switching device is preferably an electromechanical switch such as a relay. In particular examples, the single switching device is configured so that a creepage distance between any input terminal and any output terminal of the single switching device is equal to or exceeds a predetermined safety distance (e.g. 1.5 mm).

Above described examples of predetermined safety distances (e.g. 1.5 mm) for the creepage distance are merely exemplary, and may change depending (for instance) on best practice, industry standards, changes in altitude or barometric pressure, and/or desired safety margins. Other suitable examples for the predetermined safety distance include: 1 mm, 2 mm, 3 mm; 5 mm; 10 mm and so on.

In another aspect of the invention, it is proposed a tubular LED lamp that configures the LEDs into series connection or parallel connection according to whether the input is received on one end only or between two ends. As mentioned above, there is a use case that the tubular LED lamps are connected in series with the AC mains and it is desired to achieve light output unity between the lamps. Note than the tubular LED lamps connected in series with the AC mains means the Pin1 and Pin2 of two lamps are connected in series with the AC mains while the Pin3 and Pin4 of each lamp are still float. Since each lamp is powered by the AC mains (low frequency power supply), the converter is involved. The inventors find that the converters of different lamp would regulate their output current more unified if the converter's output voltage is high. Thus the inventors proposes to detect whether the input comes in via a single end or via both ends, and configure the LEDs into series connection if the input comes via the single end; and into parallel if the input comes via both ends.

Figure 9:
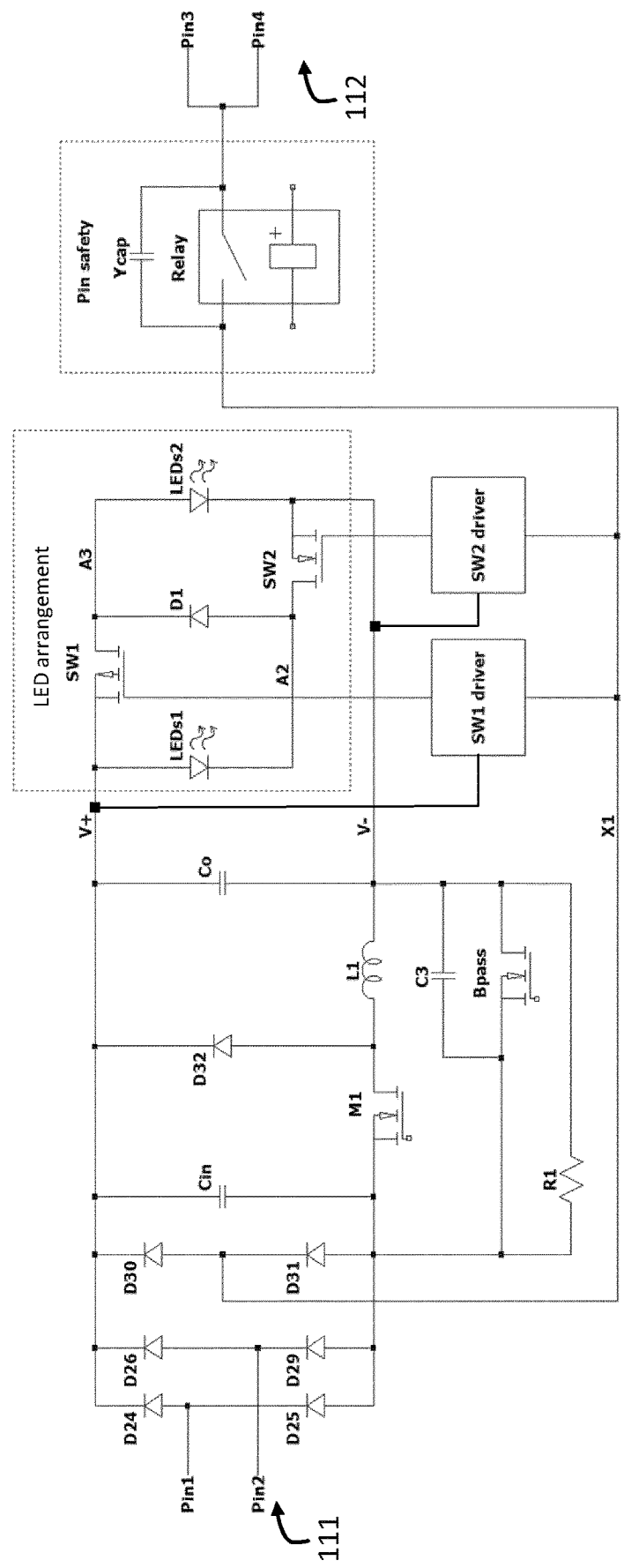
FIG. 9 illustrates the circuit schematic of a tubular LED lamp according to a second aspect of the invention, which is an improvement over the lamp shown in FIG. 1.

FIG. 9 shows an implementation of the above aspect, on top of the known circuit shown in FIG. 1. Similar components in FIG. 9 and FIG. 1 will not be explained again.

Most importantly, it is proposed a tubular LED lamp with a LED arrangement, a first end 111 and a second end 112, where the first end 111 is adapted to connect to a low frequency power supply, and the first end 111 and the second end 112 are adapted to connect to a high frequency power supply, characterized in that, comprising a control circuit adapted to: detect whether a power supply is received at the first end 111, or between the first end 111 and the second end 112, and configure the LED arrangement in a first mode having series LEDs when the power supply is received at the first end 111, not between the first end 111 and the second end 112; and configure the LED arrangement in a second mode having parallel LEDs when the power supply is received between the first end 111 and the second end 112.

The control circuit comprises two switches SW1 and SW2 and a respective drive circuit, as shown in FIG. 9. When the switches SW1 and SW2 are open when it is detected that the input is via only the first end, the LEDs1 and LEDs2 are in series connection and driven by the buck converter including the switch M1, the inductor L1 and the diode D32; when the switches SW1 and SW2 are closed when it is detected that the input is via the first end 111 and the second end 112, the LEDs1 and LEDs2 are in parallel connection, and optionally the buck converter is bypassed by the MOSFET Bypass so the input directly powers the parallel LEDs1 and LEDs2.

Figure 10:
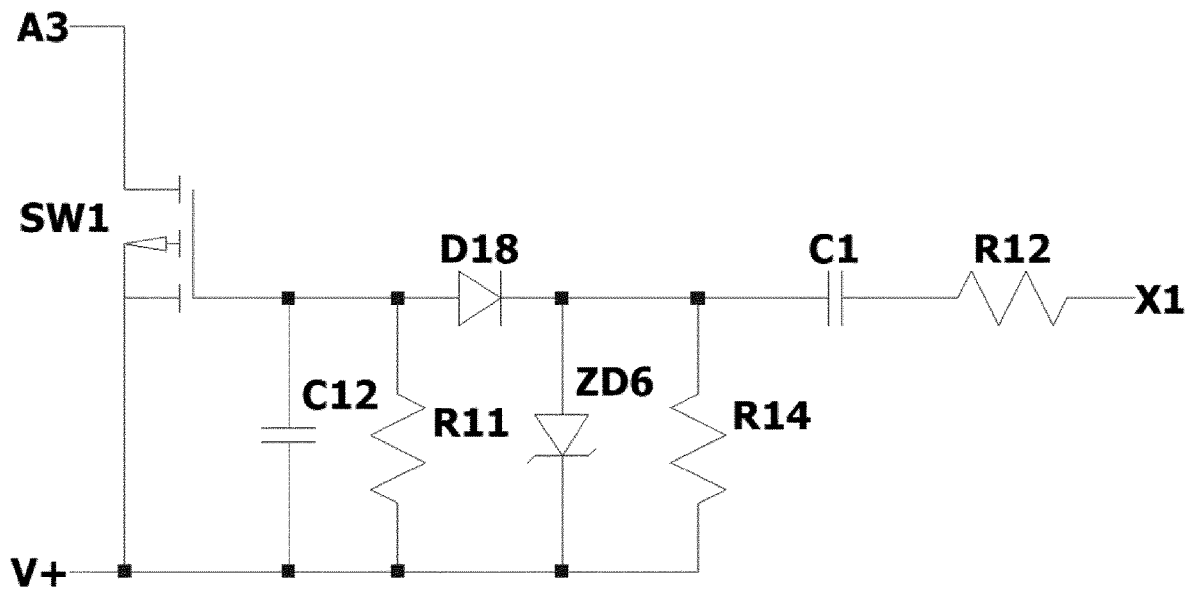
FIG. 10 illustrates an implementation of the control circuit for switch SW1 in the embodiment of FIG. 9.

FIG. 10 shows the control circuit including the switch SW1 and its drive circuit. The detection of whether the input comes via both ends is via the terminal V+ and terminal X1, wherein the terminals V+ and X1 are also shown in FIG. 9. The terminal V+ is effectively connected to the first end, via rectifying diodes, and the terminal X1 is effectively connected to the second end, via the Y-cap.

When only the first end 111 is connected to the power supply, there is no electrical path from the terminal V+ to the terminal X1. Thus the capacitor C12 is not charged and the switch SW1 is not driven to close. So the switch SW1 is open.

When the power supply is connected to both first end 111 and the second end 112, the power supply is an AC supply, and there will be current flowing to charge the capacitor C12, from the first end 111, the terminal V+, the diode D18, the capacitor C11, the resistor R12, the terminal X1, the Y-cap and to the second end 112. Preferably, the capacitance of the Y-cap and the capacitor C11 allows HF ballast frequency and AC mains/EM ballast frequency to pass and charge the capacitor C12. The switch SW1 is a PMOS thus a bias voltage from the source to the gate provided by the capacitor C11 can close the switch SW1.

Figure 11:
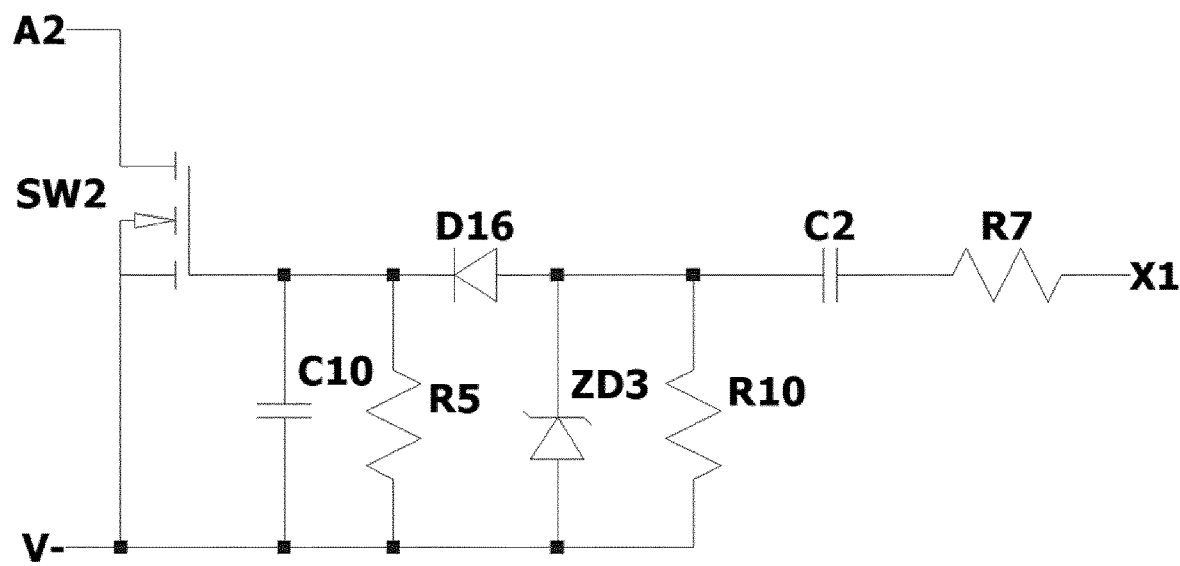
FIG. 11 illustrates an implementation of the control circuit for switch SW2 in the embodiment of FIG. 9.

FIG. 11 shows the control circuit including the switch SW2 and its drive circuit. The detection of whether the input comes via both ends is via the terminal V− and terminal X1, wherein the terminals V− and X1 are also shown in FIG. 9. The terminal V− is effectively connected to the first end, via rectifying diodes, and the terminal X1 is effectively connected to the second end, via the Y-cap.

When only the first end 111 is connected to the power supply, there is no electrical path from the terminal V− to the terminal X1. Thus the capacitor C12 is not charged and the switch SW2 is not driven to close. So the switch SW2 is open.

When the power supply is connected to both first end 111 and the second end 112, the power supply is an AC supply, and there will be current flowing to charge the capacitor C10, from the second end 112, the Y-cap, the terminal X1, the resistor R7, the capacitor C2, the diode D16, the terminal V−, and to the first end 111. Preferably, the capacitance of the Y-cap and the capacitor C10 allows HF ballast frequency and AC mains/EM ballast frequency to pass and charge the capacitor C12. The switch SW2 is a NMOS thus a bias voltage from the gate to the source provided by the capacitor C10 can close the switch SW2.

In case that the switches SW1 and SW2 are open, the LEDs1 and LEDs2 are in series connection. In case that the switches SW1 and SW2 are closed, the LEDs1 and LEDs2 are in parallel connection.

When the pin safety circuit is closed by a sufficient signal from the HF ballast connected to both ends, the Y-cap is bypassed and there is still current to charge the capacitor C10 and C11 so as to keep the switches SW1 and SW2 close.

Figure 12:
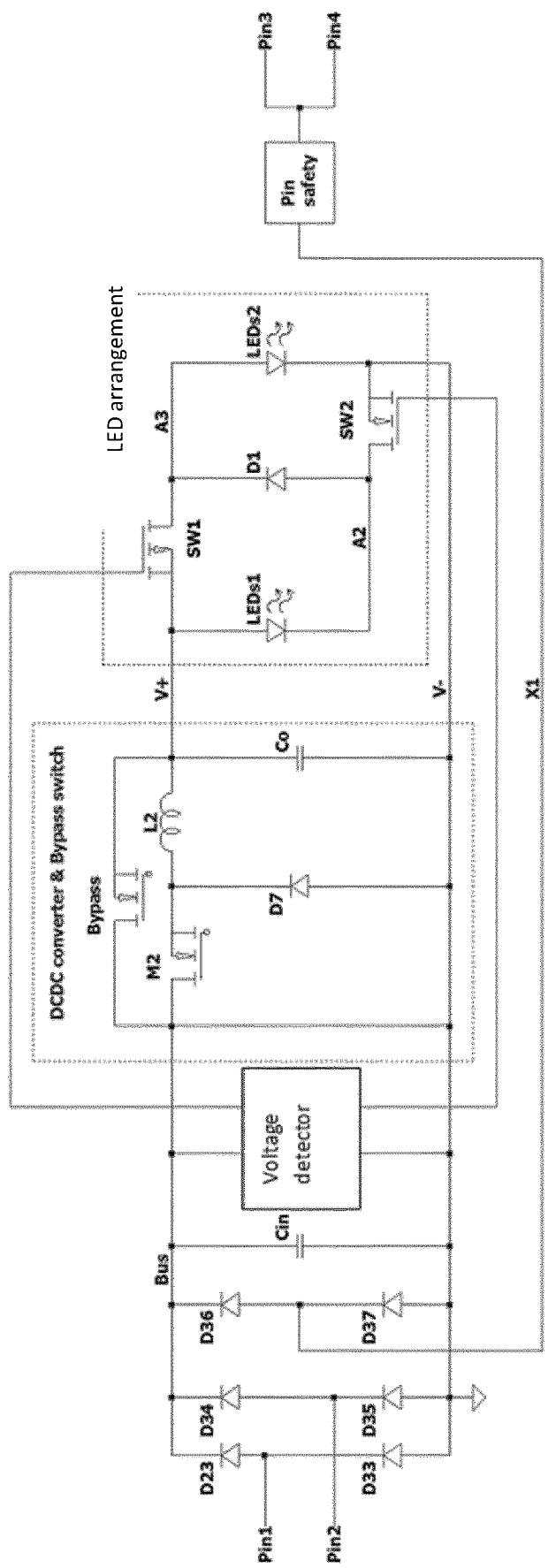
FIG. 12 illustrates the circuit schematic of a tubular LED lamp according to a third aspect of the invention, which is an improvement over the lamp shown in FIG. 1.

In an alternative third aspect, as shown in FIG. 12, it is proposed a retrofit tubular lamp configured for use with both a first type of power source and a second type of power source, comprising
an input interface comprising a first end and a second end that are both configured to be connectable to the first type of power source so as to receive power from the first type of power source, wherein the first end of the input interface is further configured to be connectable to the second type of power source so as to receive power from the second type of power source,
a converter;
a LED arrangement coupled to the converter;
a bypass switch adapted to bypass or not bypass the converter according to a frequency of the input;
characterized in that, further comprises:
a voltage detector to detect a voltage before the bypass switch and adapted to change the LED arrangement into series LEDs or parallel LEDs according to the voltage.

More specifically, if a HF ballast is connected, the bypass switch is closed (via a high frequency selection across the two end) and bypasses the buck converter, the HF ballast signal flows to the LED directly and the voltage amplitude before the bypass switch Bypass equals to the LED forward voltage, which is relatively low.

If AC mains is connected, the bypass switch is open and the buck converter connects to the AC mains, and the voltage before the bypass switch Bypass is effectively the input voltage: the peak is 230*1.414 volts for single lamp installation, and 115*1.414 volts for series lamp installation, both of which are substantially higher than the LED forward voltage in the HF case.

Then, if the detected voltage is low, the LED arrangement is set in parallel connection; if the detected voltage is high, the LED arrangement is set to series connection.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A retrofit tubular lamp configured for use with any one of a first type of power source and a second type of power source at a time, comprising:
an input interface comprising a first end and a second end, wherein the retrofit tubular lamp is adapted to be connected to the first type of power source via both of the first end and the second end, and the retrofit tubular lamp is adapted to be connected to the second type of power source via the first end alone,
a converter coupled to the first end;
a light emitting arrangement coupled to the converter as well as to the first end and the second end; and
a single switch device connected between the first end, the light emitting arrangement, and the second end, configured to be operable in at least a first switching state and a second switching state, wherein:
when operating in the first switching state and when the first type of power source is connected to the input interface, the single switch device is configured to provide a first current path between the first end and the second end of the input interface and supply power to the light emitting arrangement whilst decoupling the converter therefrom; and
when operating in the second switching state and when the second type of power source is connected to the first end of the input interface alone, the single switch device is configured to provide power to the light emitting arrangement via the converter, and create a safety creepage between the first end and the second end of the input interface such that the first end and the second end of the input interface are electrically disconnected.

2. The retrofit tubular lamp of claim 1, further configured so that, when the single switch device is operating in the second switching state, to create a safety creepage between the second end and the first end when the first type of power source is connected with an external impedance or when the second type of power source is connected to the first end.

3. The retrofit tubular lamp of claim 1, wherein the input interface comprises a rectifying arrangement at the first end and the input of the rectifying arrangement is configured to be connectable to the first type and the second type of power source, wherein the single switch device is adapted to, in the second switching state, decouple the converter from the second end.

4. The retrofit tubular lamp of claim 3, wherein the tubular lamp further comprising a further rectifying arrangement at the second end of the input interface, and:
the input of the converter is adapted to be connected to the output of the rectifying arrangement at the first end;
the light emitting arrangement is connected to the output of the converter; and
the single switch device comprises an input node connected to the output of the rectifying arrangement and an output node connected to the light emitting arrangement, and the light emitting arrangement is connected to the further rectifying arrangement, wherein the switch device is configured to:
when operating in the first switching state, allow current to flow between the input node and the output node and in turn between the first end and the second end to thereby provide the first current path and bypass the converter; and
when operating in the second switching state, electrically disconnect the first end and the second end and prevent current from flowing between the input node and output node and in turn between the first end and the second end, to thereby allow the converter to draw power.

5. The retrofit tubular lamp of claim 3, wherein:
the rectifying arrangement at the first end of the input interface comprises a positive rectifying output node and a negative rectifying output node;
the tubular lamp further comprising a further rectifying arrangement at the second end of the input interface comprising a further positive node and a further negative node; and
the single switch device is a coil-actuated relay comprises a first switching element and a second switching element being actuated as a whole, wherein the single switch device is configured to:
when operating in the first switching state and when the first type of power source is connected to the input interface, control the first switching element to connect the positive rectifying output node to the further positive node of the second end of the input interface and control the second switching element to connect the negative rectifying output to the further negative node of the second end of the input interface; and
when operating in the second switching state and when the second type of power source is connected to the input interface, control the first and second switching element to disconnect the positive and negative rectifying output nodes from the further positive and negative nodes of the second end of the input interface.

6. The retrofit tubular lamp of claim 3, wherein the single switch device comprises a change-over relay having an input terminal connected to the output of the rectifying arrangement; a first output terminal directly connected to the light emitting arrangement and a second output terminal directly connected to the converter,
wherein the change-over relay is configured to:
when the single switch device is operating in the first switching state, connect the input terminal to the first output terminal; and
when the single switch device is operating in the second switching state, connect the input terminal to the second output terminal.

7. The retrofit tubular lamp of claim 6, wherein the change-over relay comprising a drive part connected between the first end and the second end and to generate a drive voltage from the first type of power source connected to the first end and the second end and the single switch device operates in the first switching state when drive voltage is provided to the change-over relay.

8. The retrofit tubular lamp of claim 7, wherein the change-over relay is configured so that the drive part is unable to generate the drive voltage from the first type of power source connected to the first end and the single switch device operates in the second switching state when no drive voltage is provided to the change-over relay.

9. The retrofit tubular lamp of claim 7, wherein the change-over relay comprises-: a contact part that is movable between a first position, in which the contact part connects the input terminal to the first output terminal, and a second position, in which the contact part connects the input terminal to the second output terminal; and
the drive part is configured to control the position of the contact part and is coupled between the first end of the input interface and the second end of the input interface, wherein the drive part is configured to:
retrieve enough power generate the drive voltage to control the position of the contact part when there is no external impedance connected to the input interface; and
be unable to retrieve enough power to generate the drive voltage to control the position of the contact part when there is external impedance connected to the input interface.

10. The retrofit tubular lamp of claim 9, wherein the drive part comprises a coil configured to control the position of the contact part and a safety capacitor arrangement connected in series with the coil.

11. The retrofit tubular lamp of claim 3, wherein the single switch device comprises a dip switch or relay having a switch input terminal connected to the output of the rectifying arrangement; a first switch output terminal directly connected to the light emitting arrangement; a second switch output terminal directly connected to the converter; and a switching part connected to the switch input terminal and manually controllable between at least:
a first switching part position, in which the switching part connects the switch input terminal to the first switch output terminal to thereby cause the single switch device to operate in the first switching state;
a second switching part position, in which the switching part connects the switch input terminal to the second switch output terminal to thereby cause the single switch device to operate in the second switching state; and
a third switching part position, in which the switching part is disconnected from both the first switch output terminal and the second switch output terminal.

12. The retrofit tubular lamp of claim 11, wherein the creepage distance between the switching part, when in the third switching part position, and the first switch output terminal is greater than a predetermined threshold.

13. The retrofit tubular lamp of claim 1, wherein the light emitting arrangement comprises:
a plurality of light emitting units; and
a re-configuring circuit configured to:
when the single switch device is operating in the first switching state, configure the light emitting units to be connected in series; and
when the single switch device is operating in the second switching state, configured the light emitting units to be connected in parallel.

14. The retrofit tubular lamp of any of claim 1, further comprising a linear regulator connected between the converter and the light emitting units for the second type of power source, wherein said linear regulator is decoupled from the first current path between the first end and the second end of the input interface for the first type of power source.

15. The retrofit tubular lamp of claim 1, wherein the first type of power source is a high frequency power source/ballast configured for powering a fluorescent lamp; and
the second type of power source is a low frequency power source, including mains supply or a low frequency ballast configured for powering a fluorescent lamp.

16. The retrofit tubular lamp of claim 1, wherein the single switch device is in the second switching state by default when the retrofit tubular lamp is not powered.

* * * * *